United States Patent
Jung et al.

(10) Patent No.: US 11,984,138 B1
(45) Date of Patent: May 14, 2024

(54) METHOD FOR MONITORING EMOTION AND BEHAVIOR DURING CONVERSATION FOR USER IN NEED OF PROTECTION

(71) Applicant: Korea Electronics Technology Institute, Seongnam-si (KR)

(72) Inventors: Min Young Jung, Hwaseong-si (KR); Jin Yea Jang, Seongnam-si (KR); San Kim, Seongnam-si (KR); Sa Im Shin, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/384,105

(22) Filed: Oct. 26, 2023

(30) Foreign Application Priority Data

Oct. 31, 2022  (KR) .................. 10-2022-0142105

(51) Int. Cl.
*G06V 40/20* (2022.01)
*G10L 25/63* (2013.01)

(52) U.S. Cl.
CPC ............ *G10L 25/63* (2013.01); *G06V 40/20* (2022.01)

(58) Field of Classification Search
CPC ........ G06V 40/20; G06V 10/82; G10L 25/63; G10L 15/18
See application file for complete search history.

(56) References Cited

U.S. PATENT DOCUMENTS

| | | | | |
|---|---|---|---|---|
| 6,480,826 B2 * | 11/2002 | Pertrushin | ............... | G10L 17/26 704/274 |
| 10,289,076 B2 * | 5/2019 | Kim | ............... | G06N 3/008 |
| 2021/0005187 A1 * | 1/2021 | Shin | ............... | G06V 20/40 |

FOREIGN PATENT DOCUMENTS

| | | |
|---|---|---|
| KR | 10-2019-0068021 A | 6/2019 |
| KR | 10-2021-0125367 A | 10/2021 |
| KR | 10-2022-0025332 A | 3/2022 |

OTHER PUBLICATIONS

Korean Office Action Issued on Mar. 20, 2023, in Counterpart Korean Patent Application No. 10-2022-0142105 (8 Pages in Korean, 7 Pages in English).

* cited by examiner

*Primary Examiner* — Phuoc Tran
(74) *Attorney, Agent, or Firm* — NSIP Law

(57) ABSTRACT

There is a method for monitoring emotion and behavior occurring during a conversation with a user who is in need of protection. According to an embodiment, a user monitoring method receives an input of a user utterance and generates a conversation content by using a conversation model based on a user utterance content, converts the generated conversation content into a voice and outputs the voice, and recognizes emotion of the user by using an emotion analysis model based on the user utterance content and monitors the emotion. Accordingly, the method may monitor behavior/emotion of a user through a natural conversation while allowing a specialist/guardian to monitor an abnormal sign of a user who is in need of protection.

9 Claims, 2 Drawing Sheets

METHOD FOR MONITORING EMOTION AND BEHAVIOR DURING CONVERSATION FOR USER IN NEED OF PROTECTION

CROSS-REFERENCE TO RELATED APPLICATION(S) AND CLAIM OF PRIORITY

This application is based on and claims priority under 35 U.S.C. § 119 to Korean Patent Application No. 10-2022-0142105, filed on Oct. 31, 2022, in the Korean Intellectual Property Office, the disclosure of which is herein incorporated by reference in its entirety.

BACKGROUND

Field

The disclosure relates to artificial intelligence (AI) technology, and more particularly, to a method and a system for monitoring, which recognize and record emotion and behavior of a user who is in need of protection so as to allow a specialist or a guardian to check.

Description of Related Art

For a user who is in need of protection, for example, a patient who is mentally or emotionally unstable, there is a need to continuously monitor his/her emotion or behavior. The best way to monitor emotion/behavior may be that a specialist such as a doctor has a conversation with a patient. However, this method is possible only when a patient sees a doctor, and it is impossible to continuously perform this method.

To this end, technologies for monitoring emotion and behavior of a user who is in need of protection by using information technology (IT) devices have been proposed. However, these technologies remain at a level of just observing users.

That is, user's emotion or behavior should be monitored during a natural conversation with a user, but related-art monitoring methods have a limitation to doing so.

SUMMARY

The disclosure has been developed in order to solve the above-described problems, and an object of the disclosure is to provide a method and an apparatus for monitoring emotion and behavior occurring during a natural conversation with a user who is in need of protection.

According to an embodiment of the disclosure to achieve the above-described object, a user monitoring method may include: a first input step of receiving an input of a user utterance; a step of generating a conversation content by using a conversation model based on an inputted user utterance content; a step of converting the generated conversation content into a voice and outputting the voice; a first recognition step of recognizing emotion of the user by using an emotion analysis model based on the user utterance content while performing the first input step, the generation step, and the output step; and a first monitoring step of monitoring the recognized user emotion.

According to an embodiment, the user monitoring method may include: a step of receiving a user image while performing the first input step, the generation step, and the output step; a second recognition step of recognizing behavior of the user by using a behavior analysis model based on the user image; and a second monitoring step of monitoring the recognized user behavior.

The generation step may include: a step of determining a conversation model based on the inputted user utterance content; and a step of generating a conversation content by using the determined conversation model.

The determination step may include determining one of a first conversation model which is an AI model that is trained to generate a response by using a user utterance content and knowledge related to the utterance content, and a second conversation model which is an AI model that is trained to generate a response by using only a user utterance content.

The first recognition step and the second recognition step may be performed only when the second conversation model is determined at the determination step.

The determination step may include: a step of extracting pieces of relevant knowledge based on the inputted user utterance content; a step of extracting a piece of knowledge that has a highest degree of association among the extracted pieces of relevant knowledge; and a step of selecting a conversation model based on the degree of association of the extracted piece of knowledge.

The selection step may include: selecting the first conversation model when the degree of association of the extracted piece of knowledge is greater than or equal to a reference value; and selecting the second conversation model when the degree of association of the extracted piece of knowledge is less than the reference value.

The user monitoring method may further include a step of displaying a result of the first monitoring step and a result of the second monitoring step.

The user monitoring method may further include a step of transmitting the result of the first monitoring step and the result of the second monitoring step to a terminal at a remote distance.

According to another embodiment of the disclosure, a user monitoring apparatus may include: an input unit configured to receive an input of a user utterance; a processor configured to generate a conversation content by using a conversation model based on a user utterance content inputted through the input unit, to recognize emotion of the user by using an emotion analysis model based on the user utterance content while generating the conversation content, and to monitor the recognized user emotion; and an output unit configured to convert the conversation content generated by the processor into a voice, and to output the voice.

According to still another embodiment of the disclosure, a user monitoring method may include: a step of generating a conversation content by using a conversation model based on a user utterance content; a first recognition step of recognizing emotion of a user by using an emotion analysis model based on the user utterance content while performing the generation step; and a second recognition step of recognizing behavior of the user by using a behavior analysis model based on a user image while performing the generation step.

According to yet another embodiment of the disclosure, a computer-readable recording medium may have a program recorded thereon to perform a user monitoring method, the user monitoring method including: a step of generating a conversation content by using a conversation model based on a user utterance content; a first recognition step of recognizing emotion of a user by using an emotion analysis model based on the user utterance content while performing the generation step; and a second recognition step of recognizing behavior of the user by using a behavior analysis model based on a user image while performing the generation step.

According to embodiments of the disclosure as described above, the method and apparatus may monitor behavior/emotion of a user through a natural conversation while allowing a specialist/guardian to monitor an abnormal sign (no movement, abnormal behavior, abnormal emotion) of a user who is in need of protection.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Figure 1:
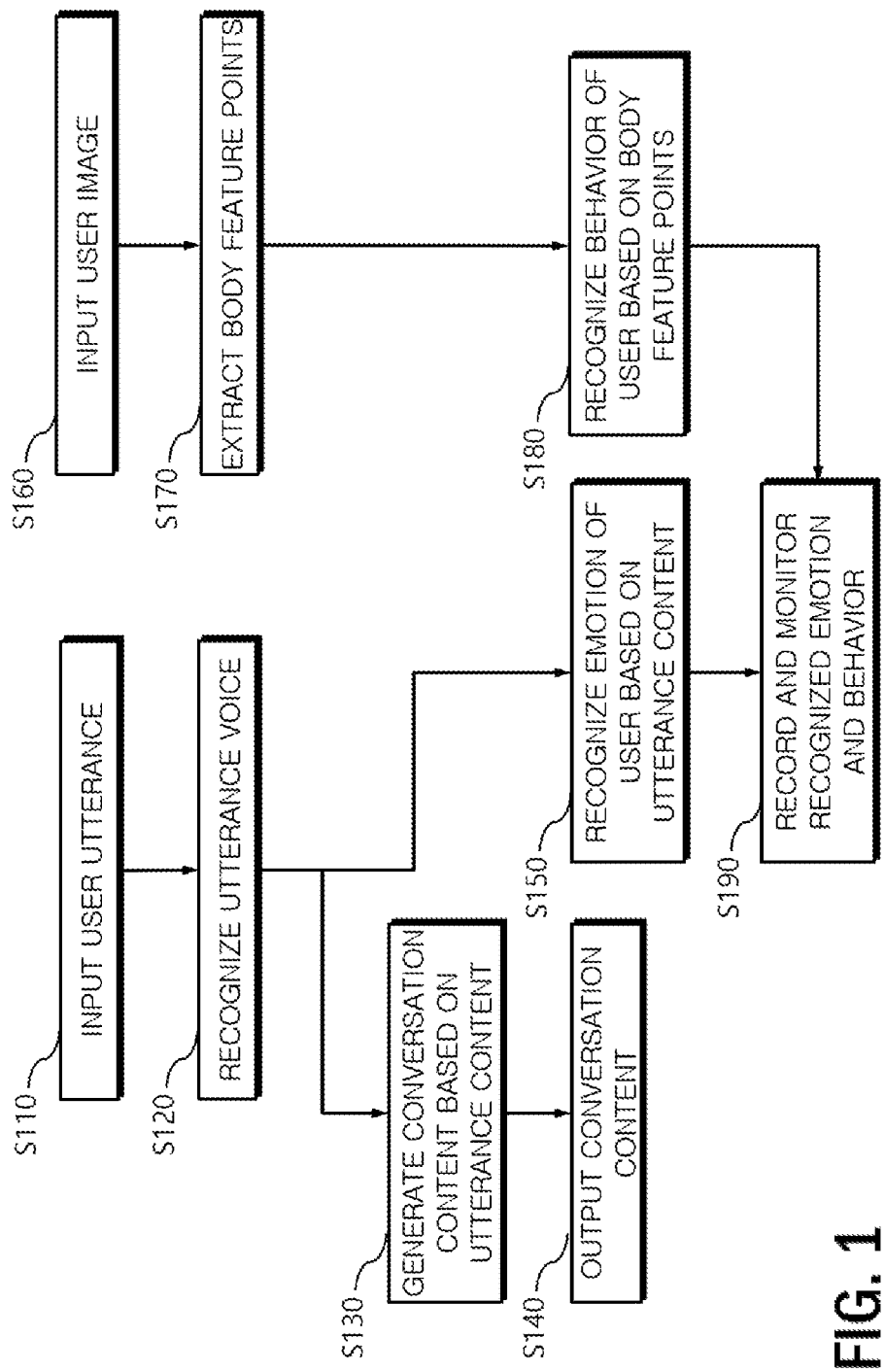
FIG. 1 is a flowchart provided to explain an AI-based user emotion/behavior monitoring method according to an embodiment of the disclosure.

FIG. 1 is a flowchart provided to explain an AI-based user emotion/behavior monitoring method according to an embodiment of the disclosure. In the user emotion/behavior monitoring method according to an embodiment, emotion and behavior naturally expressed during a conversation with a user may be monitored.

A user whose emotion and behavior will be monitored may be a user who is in need of protection. However, the technical concept of the disclosure may be applied when other users are monitored.

In order to have a natural conversation with a user, the method may receive an input of utterance of the user (S110) and may recognize a user utterance voice and convert the same into a text (S120). Based on a user utterance content obtained at step S110 and step S120, the method may generate a conversation content by using a conversation model, and may convert the generated conversation content into a voice and may output the voice (S140).

The conversation model may be an AI model that is trained to analyze an inputted user utterance content and to generate an appropriate conversation content, and may be implemented by a neural network of a well-known structure, which includes a convolution neural network (CNN), a recurrent neural network (RNN), etc., and outputs a conversation content in response to an utterance content when a user utterance content is inputted. The conversation model may be trained through a well-known learning method including supervised learning.

While having a conversation between the conversation model and the user through steps S110 to S140, the method may recognize emotion of the user by using an emotion analysis model, based on the user utterance content obtained through steps S110 and S120 (S150).

The emotion analysis model may be an AI model that is trained to analyze an inputted user utterance content and to predict an emotional state of a user, and may be implemented by a neural network of a well-known structure, which includes a CNN, a RNN, etc., and recognizes user's emotion from an utterance content when a user utterance content is inputted, and outputs the user's emotion. The emotion analysis model may be trained through a well-known learning method including supervised learning.

While having a conversation between the conversation model and the user through steps S110 to S140, the method may receive an input of a user image that is generated by capturing by a camera (S160), and may extract body feature points from the inputted user image (S170).

The method may recognize behavior of the user by using a behavior analysis model based on information on the body feature points extracted at step S170 (S180). The behavior analysis model may be an AI model that is trained to analyze information on body feature points inputted and to predict behavior of a user, and may be implemented by a neural network of a well-known structure, which includes a CNN, a RNN, etc. and recognizes a type of user behavior from an image when the image is inputted, and outputs the user behavior. The behavior analysis model may be trained through a well-known learning method including supervised learning.

Thereafter, the method may record the emotion and behavior of the user which is recognized through steps S150 to S180 in chronological order, and may monitor emotion and behavior which have been recorded for a predetermined time (S190).

Monitoring at step S190 may include processes of: 1) displaying emotion and behavior of the user on a screen; 2) transmitting emotion and behavior of the user to a terminal of a specialist or a guardian at a remote distance; and 3) detecting an abnormal value in emotion and behavior of the user, and outputting an alarm or remotely transmitting.

Hereinafter, step S130 of generating a conversation content described above will be described in detail. A conversation content may be generated by using a conversation model as described above. Two types of conversations models may be used in an embodiment of the disclosure.

One conversation model may be an AI model that is trained to generate a response by using a "user utterance content obtained through steps S110 and S120" and "knowledge related to the utterance content", and is referred to as a knowledge conversation model. The knowledge conversation model may be implemented by a neural network of a well-known structure which includes a CNN, a RNN, etc. and generates and outputs a response when a user utterance content and knowledge related to the user utterance content are inputted. The knowledge conversation model may be trained through a well-known learning method including supervised learning.

The other conversation model may be an AI model that is trained to generate a response by using only a "user utterance content obtained through steps S110 and S120" without using "knowledge related to the utterance content". This conversation model may be a conversation model that generates a response for expressing empathy with a user utterance, and is referred to as an empathetic conversation model. The empathetic conversation model may be implemented by a neural network of a well-known structure which includes a CNN, a RNN, etc. and generates and outputs a response when a user utterance content is inputted. The empathetic conversation model may be trained through a well-known learning method including supervised learning. For example, the empathetic conversation model may generate an agreeable response to respond to user's utterance shortly and quickly.

Knowledge related to an utterance content may be extracted based on the user utterance content obtained through steps S110 and S120. Knowledge extraction may be performed by using a pre-owned knowledge DB, a knowledge DB established on a web.

A conversation model to generate a conversation content may be selected from the above-described two conversation models, based on a result of knowledge extraction, and a specific method of generating a conversation content will be described hereinbelow.

In extracting knowledge related to an utterance content based on the utterance content of a user, a degree of association between knowledge and the utterance content may be proposed as a probability value. That is, a degree of association between an utterance content and knowledge may be represented by a probability value. A degree of association between an utterance content and knowledge may be calculated in a well-known method. As a probability value is higher, a degree of association between a user utterance content and knowledge is higher, and reversely, as a probability is lower, a degree of association between a user utterance content and knowledge is lower.

The degree of association may be a criterion for selecting a conversation model. Specifically, a highest degree of association among degrees of association of pieces of knowledge extracted in relation to a user utterance content may be a criterion for selecting a conversation model.

Accordingly, a piece of knowledge having a highest degree of association may be selected from extracted pieces of knowledge, and the degree of association of the knowledge selected may be compared with a reference value. When the degree of association is greater than or equal to the reference value as a result of comparing, the knowledge conversation model may be selected. This is because there is knowledge that is highly associated with the user utterance and an appropriate answer desired by a user can be generated based on the knowledge.

On the other hand, when the degree of association is less than the reference value as a result of comparing, the empathetic conversation model may be selected. This is because there is no knowledge that is highly associated with the user utterance and a somewhat wrong answer may be generated when an answer is generated based on the knowledge.

The reference value for comparing with the degree of association of knowledge to select a conversation model may be implemented to vary based on a result of selecting a previous conversation model. Namely, when the knowledge conversation model is selected in a previous conversation, the reference value may be reduced so that the possibility of selecting the knowledge conversation model increases, and, when the empathetic conversation model is selected in the previous conversation, the reference value may be increased so that the possibility of selecting the empathetic conversation model increases.

Typically, a conversation content of a person is not likely to be suddenly changed. That is, when a person starts a knowledge conversation, the person tends to maintain the knowledge conversation for a while, and, when the knowledge conversation changes to an empathetic conversation, the person tends to continue the empathetic conversation for a while. The method of changing the reference value described above reflects this tendency.

Step S150 of recognizing emotion of the user, step S180 of recognizing behavior of the user, and step S190 of monitoring the recognized emotion and behavior of the user may be performed only when the empathetic conversation model is selected as a conversation model.

When a conversion is performed through the empathetic conversation model, user's inner emotion and behavior resulting therefrom may be well expressed. On the other hand, when a conversation is performed through the knowledge conversation model, user's emotion and behavior may not be well expressed.

Other methods are available. For example, emotion and behavior may be recognized either when a conversation is performed through the empathetic conversation model or when a conversation is performed through the knowledge conversation model. In this case, in monitoring emotion and behavior, a high weighting may be given to the former case and a low weighting may be given to the latter case, so that abnormal emotion and behavior are detected.

Figure 2:
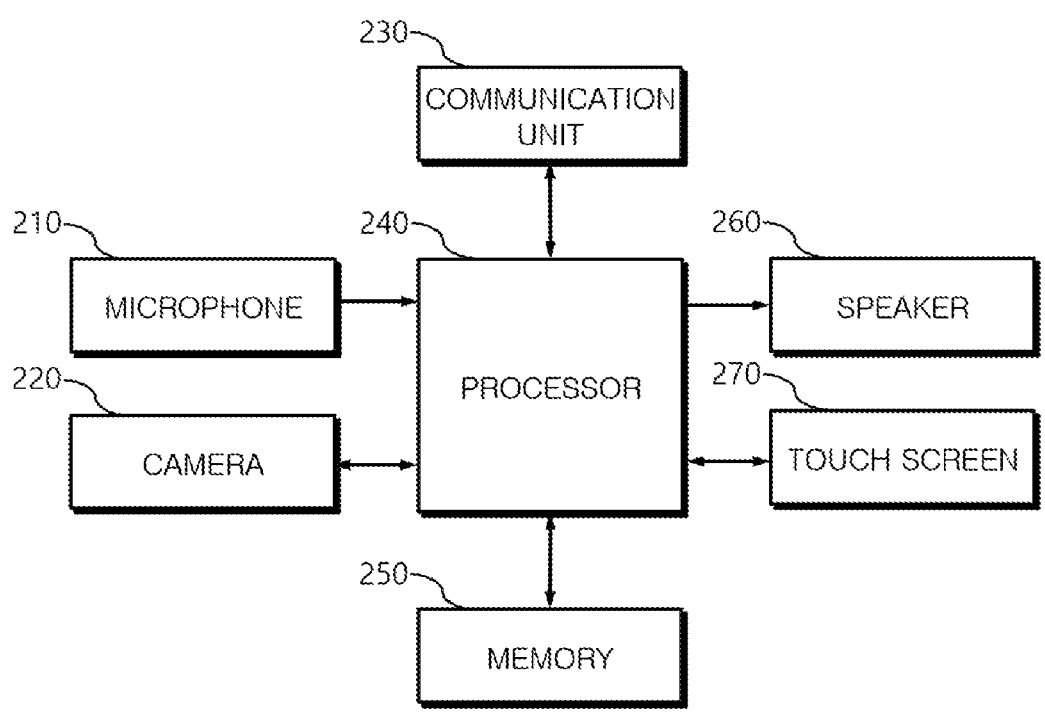
FIG. 2 is a view illustrating a configuration of a user emotion/behavior monitoring apparatus according to another embodiment of the disclosure.

FIG. 2 is a view illustrating a configuration of a user emotion/behavior monitoring apparatus according to another embodiment.

The user emotion/behavior monitoring apparatus according to an embodiment may be implemented by a smartphone including a microphone 210, a camera 220, a communication unit 230, a processor 240, a memory 250, a speaker 260, and a touch screen 270. However, the smartphone is merely one of apparatuses that implement the user emotion/behavior monitoring apparatus, and the user emotion/behavior monitoring apparatus may be implemented by other apparatuses.

The microphone 210 is a means for receiving an input of a voice utterance of a user, and the camera 220 is a means for generating a user image by photographing.

The processor 240 generates a conversation content by using a conversation model, based on the user utterance content inputted through the microphone 210, while recognizing emotion of the user by using an emotion analysis model.

In addition, the processor 240 extracts body feature points from the user image, and recognizes behavior of the user by using a behavior analysis model based on the extracted body feature point information.

The memory 250 is a storage medium on which emotion and behavior of the user recognized by the processor 240 are recorded in chronological order. The speaker 260 outputs the conversation content generated by the processor 240 as a voice.

In addition, the processor 240 may display emotion and behavior of the user which have been recorded on the memory 250 for a predetermined time on the touch screen

270. The processor 240 may monitor emotion and behavior of the user and may display a result of monitoring on the touch screen 270 or may transmit the result to a terminal of a specialist or guardian at a remote distance through the communication unit 230.

Up to now, a method and an apparatus for monitoring emotion/behavior while performing a conversation with a user who is in need of protection have been described in detail with reference to preferred embodiments.

Embodiments of the disclosure propose a solution for monitoring behavior/emotion of a user through a natural conversation while allowing a specialist/guardian to monitor an abnormal sign (no movement, abnormal behavior, abnormal emotion) of a user who is in need of protection.

Accordingly, even when a user can not directly have a conversation with a specialist (doctor, etc.), emotion and behavior that the user may have in everyday conversation may be checked with numerical values, and a state of the user may be checked through monitoring.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A user monitoring method comprising:
   a first input step of receiving an input of a user utterance;
   a step of generating a conversation content by using a conversation model based on an inputted user utterance content;
   a step of converting the generated conversation content into a voice and outputting the voice;
   a first recognition step of recognizing emotion of the user by using an emotion analysis model based on the user utterance content while performing the first input step, the generation step, and the output step; and
   a first monitoring step of monitoring the recognized user emotion,
   wherein the conversation model is a neural network that generates a conversation content for responding to an utterance content when a user utterance content is inputted, and outputs the conversation content,
   wherein the emotion analysis model is a neural network that recognizes emotion of a user from an utterance content when a user utterance content is inputted, and outputs the emotion of the user,
   wherein the step of generating comprises: a step of determining one of a first conversation model and a second conversation model based on an inputted user utterance content; and a step of generating a conversation content by using the determined conversation model,
   wherein the first conversation model is a neural network that receives a user utterance content and knowledge related to the utterance content, and generates a response from the knowledge related to the user utterance content and outputs the response,
   wherein the second conversation model is a neural network that receives only a user utterance content and generates a response from the inputted user utterance content and outputs the response,
   wherein the first recognition step is performed when the second conversation model is determined at the determination step, but is not performed when the first conversation model is determined at the determination step.

2. The user monitoring method of claim 1, comprising:
   a step of receiving a user image while performing the first input step, the generation step, and the output step;
   a second recognition step of recognizing a type of user behavior of the user by using a behavior analysis model based on the user image; and
   a second monitoring step of monitoring the recognized user behavior,
   wherein the behavior analysis model is a neural network that recognizes a type of user behavior from an image when a user image is inputted, and outputs the type of user behavior.

3. The user monitoring method of claim 2, further comprising a step of displaying a result of the first monitoring step and a result of the second monitoring step.

4. The user monitoring method of claim 3, further comprising a step of transmitting the result of the first monitoring step and the result of the second monitoring step to a terminal at a remote distance.

5. The user monitoring method of claim 1, wherein the determination step comprises:
   a step of extracting pieces of relevant knowledge which are knowledge related to the inputted user utterance content;
   a step of extracting a piece of knowledge that has a highest degree of association with the user utterance content among the extracted pieces of relevant knowledge; and
   a step of selecting a conversation model based on the degree of association of the extracted piece of knowledge,
   wherein the degree of association is a degree of association between an utterance content and knowledge that is indicated by a probability value.

6. The user monitoring method of claim 5, wherein the selection step comprises: selecting the first conversation model when the degree of association of the extracted piece of knowledge is greater than or equal to a reference value; and selecting the second conversation model when the degree of association of the extracted piece of knowledge is less than the reference value.

7. A user monitoring apparatus comprising:
   an input unit configured to receive an input of a user utterance;
   a processor configured to generate a conversation content by using a conversation model based on a user utterance content inputted through the input unit, to recognize emotion of the user by using an emotion analysis model based on the user utterance content while generating the conversation content, and to monitor the recognized user emotion; and an output unit configured to convert the conversation content generated by the processor into a voice, and to output the voice, wherein the conversation model is a neural network that generates a conversation content for responding to an utterance content when a user utterance content is inputted, and outputs the conversation content, wherein the emotion analysis model is a neural network that recognizes emotion of a user from an utterance content when a user utterance content is inputted and outputs the emotion of the user, wherein the processor is configured to determine one of a first conversation model and a second conversation model based on an inputted user utterance content, and to generate a conversation content by using the determined conversation model, wherein the first conversation model is a neural network that receives a user utterance content and knowledge related to the utterance content, and generates a response from the knowledge related to the user utterance content and outputs the response, wherein the second conversation model is a neural network that receives only a user utterance content and generates a response from the inputted user utterance content and outputs the response, wherein the processor is configured to recognize emotion of the user and to monitor when the second conversation model is determined, but is configured not to recognize emotion of the user and not to monitor when the first conversation model is determined.

8. A user monitoring method comprising:

a step of generating a conversation content by using a conversation model based on a user utterance content;

a first recognition step of recognizing emotion of a user by using an emotion analysis model based on the user utterance content while performing the generation step; and a second recognition step of recognizing behavior of the user by using a behavior analysis model based on a user image while performing the generation step, wherein the conversation model is a neural network that generates a conversation content for responding to an utterance content when a user utterance content is inputted, and outputs the conversation content, wherein the emotion analysis model is a neural network that recognizes emotion of a user from an utterance content when a user utterance content is inputted, and outputs the emotion of the user, wherein the step of generating comprises: a step of determining one of a first conversation model and a second conversation model based on an inputted user utterance content; and a step of generating a conversation content by using the determined conversation model, wherein the first conversation model is a neural network that receives a user utterance content and knowledge related to the utterance content, and generates a response from the knowledge related to the user utterance content and outputs the response, wherein the second conversation model is a neural network that receives only a user utterance content and generates a response from the inputted user utterance content and outputs the response, wherein the first recognition step is performed when the second conversation model is determined at the determination step, but is not performed when the first conversation model is determined at the determination step.

9. A non-transitory computer-readable recording medium storing instructions that, when executed by one or more processors, configure the one or more processors to perform the method of claim 8.

* * * * *